United States Patent
Grimm et al.

(10) Patent No.: US 9,173,196 B2
(45) Date of Patent: Oct. 27, 2015

(54) ADAPTIVE MULTI-CHANNEL ACCESS FOR VEHICULAR NETWORKS

(75) Inventors: Donald K. Grimm, Utica, MI (US); Fan Bai, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1119 days.

(21) Appl. No.: 12/899,620

(22) Filed: Oct. 7, 2010

(65) Prior Publication Data

US 2012/0087292 A1    Apr. 12, 2012

(51) Int. Cl.
| | |
|---|---|
| *H04W 72/04* | (2009.01) |
| *H04W 72/02* | (2009.01) |
| *H04W 24/00* | (2009.01) |
| *H04W 72/12* | (2009.01) |
| *H04W 84/18* | (2009.01) |

(52) U.S. Cl.
CPC .............. *H04W 72/02* (2013.01); *H04W 24/00* (2013.01); *H04W 72/042* (2013.01); *H04W 72/1278* (2013.01); *H04W 84/18* (2013.01)

(58) Field of Classification Search
CPC .. H04W 84/81; H04W 72/0406; H04W 16/10
See application file for complete search history.

(56) References Cited

U.S. PATENT DOCUMENTS

| | | | | |
|---|---|---|---|---|
| 5,461,627 | A * | 10/1995 | Rypinski | 370/346 |
| 5,805,633 | A * | 9/1998 | Uddenfeldt | 375/133 |
| 5,862,130 | A * | 1/1999 | Tat et al. | 370/330 |
| 6,636,500 | B2 * | 10/2003 | Krishnamoorthy et al. | 370/347 |
| 6,687,503 | B1 * | 2/2004 | Porter et al. | 455/452.1 |
| 7,180,915 | B2 * | 2/2007 | Beyer et al. | 370/516 |
| 7,301,959 | B1 * | 11/2007 | Peterson et al. | 370/443 |
| 7,379,438 | B2 * | 5/2008 | Yuang et al. | 370/329 |
| 7,639,709 | B1 * | 12/2009 | Amis et al. | 370/462 |
| 7,852,796 | B2 * | 12/2010 | Wang et al. | 370/314 |
| 7,948,934 | B2 * | 5/2011 | Espina et al. | 370/328 |
| 8,391,199 | B2 * | 3/2013 | Sampath et al. | 370/312 |
| 2004/0259563 | A1 * | 12/2004 | Morton et al. | 455/452.2 |
| 2006/0019679 | A1 * | 1/2006 | Rappaport et al. | 455/456.5 |

(Continued)

FOREIGN PATENT DOCUMENTS

CN     101023635 A     8/2007

OTHER PUBLICATIONS

Uzcategui R. A. u.a.: WAVE: A Tutorial. In: IEEE Communications Magazine, May 2009, Seite 126-132.

(Continued)

*Primary Examiner* — Huy D Vu
*Assistant Examiner* — Bao G Nguyen

(57) ABSTRACT

A system and method is provided for dynamically self-allocating channel access for communication between communicating entities in an inter-vehicle ad hoc network. A respective entity observes communication activity over each inter-vehicle ad hoc network communication channel. Available time slots are identified within each communication channel for the respective entity to broadcast a data packet in response to the observed communication activity on a respective channel. An available communication channel and timeslot are selected to broadcast the data packet. A message is broadcast within the inter-vehicle ad hoc network that provides a schedule identifying the communication channel and time slot selected for broadcasting the data packet by the respective entity. The data packet is broadcast over the selected communication channel at the respective timeslot.

17 Claims, 3 Drawing Sheets

(56) References Cited

U.S. PATENT DOCUMENTS

| | | |
|---|---|---|
| 2006/0215593 A1 | 9/2006 | Wang |
| 2007/0223436 A1* | 9/2007 | Lenardi et al. ............... 370/338 |
| 2009/0122738 A1* | 5/2009 | Chen et al. ................... 370/312 |
| 2009/0129323 A1* | 5/2009 | Chen et al. ................... 370/329 |
| 2012/0120883 A1* | 5/2012 | Chen et al. ................... 370/329 |

OTHER PUBLICATIONS

Chen, Qi, u.s.: IEEE 1609.4 DSRC Multi-Channel Operations and Its Implications on Vehicle Safety Communication. In: IEEE Vehicular Networking Conference Proc., 2009, Seite 1-8.

* cited by examiner

ADAPTIVE MULTI-CHANNEL ACCESS FOR VEHICULAR NETWORKS

BACKGROUND OF INVENTION

An embodiment relates generally to vehicular wireless networking, in which multiple wireless channels (e.g., frequency bands) simultaneously exist within the inter-vehicle ad hoc networks. These wireless channels include one control channel (CCH) and multiple service channels (SCH).

Data packet sharing of non-safety related information between entities such as a fixed entity (e.g., roadside equipment (RSE)), and moving vehicles typically involves the RSE broadcasting data to a moving vehicle. The RSE occupies a respective communication timeslot and broadcasts data packets to the moving vehicles over a dedicated communication channel. Since the RSE is always in a fixed location and maintains a same broadcast time, dedicating a respective channel and timeslot to a RSE is an efficient use of a broadcast network. However, a moving vehicle's attempt to be a service provider in broadcasting non-safety related information to other vehicles and entities creates complications. That is, assigning each vehicle within a network a permanent timeslot within a particular channel would create an overcrowding condition as the number of vehicles would outnumber the number of available timeslots and channels. Moreover, unlike fixed entities which are permanently stationed within the broadcast region, vehicles are transient and dedicating a timeslot in a channel to a respective vehicle that broadcasts information infrequently is not an efficient use of the broadcast network. Alternatively, allowing remote entities to randomly choose a channel and timeslot which to broadcast information may result in contention which is the collision of data packets broadcast by two or more vehicles over a same communication channel at substantially a same instant of time. A centralized processing unit can be used to organize and control a broadcast schedule of all entities in the communication network requires; however, dedicating a central processing unit to be a service provider requires oversight by an individual or organization and is costly.

SUMMARY OF INVENTION

An advantage of an embodiment is the dynamic allocation of a communication channel and timeslot for broadcasting non-safety related information by entities in an inter-vehicle ad hoc communication network. Each entity of the communication network that transmits non-safety related information is a service provider itself. Each service provider monitors the communications channels of the network and dynamically determines which communication channel and timeslot are available to broadcast the non-safety related information, while there are a number of other entities within the network generating regular communication activities. In addition, each service provider dynamically monitors the transmission of its broadcast data and determines if contention is present. If contention is present, a service provider dynamically re-allocates its broadcast schedule to another timeslot within the same channel or another channel.

An embodiment contemplates a method of dynamically self-allocating channel access for communication between communicating entities in an inter-vehicle ad hoc network. A respective entity observes communication activity over each inter-vehicle ad hoc network communication channel. Available time slots are identified within each communication channel for the respective entity to broadcast a data packet in response to the observed communication activity on a respective channel. An available communication channel and timeslot are selected to broadcast the data packet. A message is broadcast within the inter-vehicle ad hoc network that provides a schedule identifying the communication channel and time slot selected for broadcasting the data packet by the respective entity. The data packet is broadcast over the selected communication channel at the respective timeslot.

An embodiment contemplates a channel access for a communication system within an inter-vehicle ad hoc network for allocating access communication timeslots within one of a plurality of communication channels within the inter-vehicle ad hoc network. A processor of a transmitting entity selectively controls a broadcast of data packets over the inter-vehicle ad hoc network by the transmitting entity. The processor observes communication activity over each of the communication channels by a respective entity. The controller determines available time slots within each communication channel for the respective entity to transmit a data packet in response to the observed communication activity. The controller identifies an available communication channel and timeslot to transmit the data packet. A transmitter of the transmitting entity broadcasts a message within the inter-vehicle ad hoc network that provides a schedule identifying the communication channel and time slot selected for broadcasting the data packet by the respective entity. The transmitter further broadcasts the data packet over the selected communication channel at the respective timeslot

DETAILED DESCRIPTION

Figure 1:
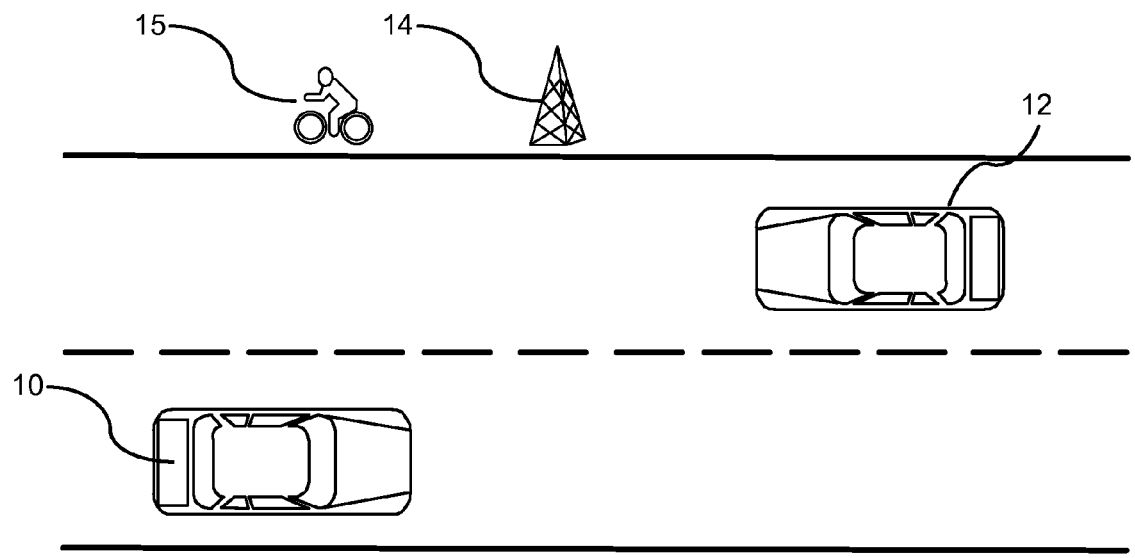
FIG. 1 is a graphical illustration of entities in communication with one another over an inter-vehicle communication network.

There is shown generally in FIG. 1 a host vehicle 10 in communication with a plurality of remote entities such as mobile vehicle 12 or a fixed infrastructure (e.g., roadside equipment (RSE)) 14. The host vehicle and the remote entities broadcast non-safety related information messages as part of a general V2X wireless message over a respective inter-vehicle ad hoc communication network. An example of communication network may include, but is not limited to, a dedicated short range communication protocol (DSRC). Alternatively the remote entity may include a pedestrian 15 (e.g., walking, biking, or other mode of motorized or non-motorized transportation used by the pedestrian) having a communication device that can be used in the inter-vehicle ad hoc communication network.

The V2X wireless message may contain data including, but not limited to, maps, music, video, multi-media content, and other non-safety related content that a service provider may desire to share with a remote entity. The service provider, as is described herein, is any entity that schedules and broadcasts non-safety related content to any other entity.

Figure 2:
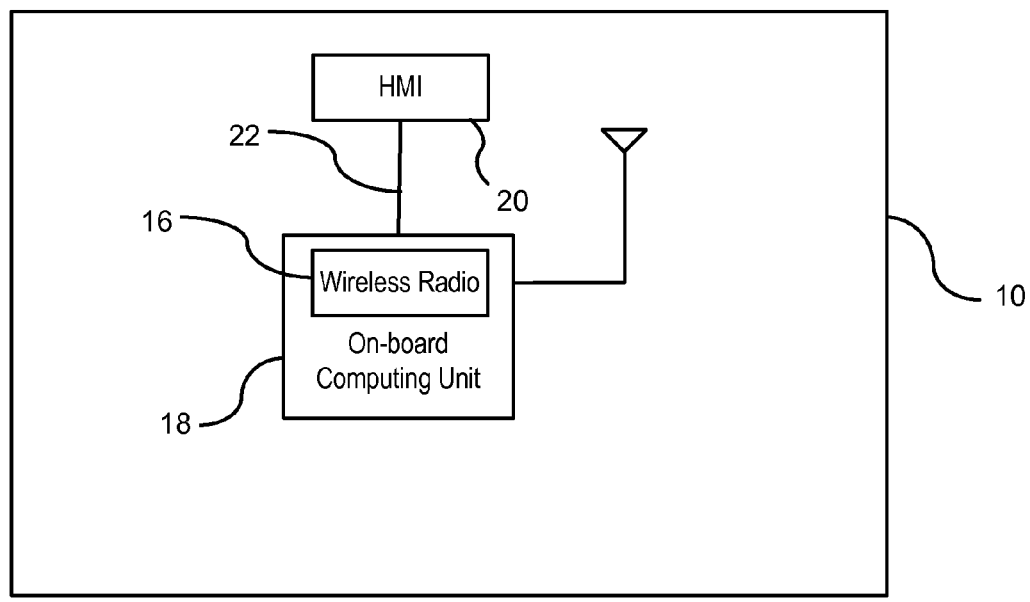
FIG. 2 is a communication architecture for the respective entity of the inter-vehicle communication network.

FIG. 2 illustrates a communication architecture for the host vehicle 10 dynamically allocating a channel and timeslot for its broadcast message. The host vehicle 10 and the remote entities are each equipped with a wireless radio 16 (e.g.

DSRC) that includes a transmitter and a receiver for broadcasting and receiving the wireless messages.

The host vehicle 10 and remote entities further include an on-board computing unit 18 for processing data broadcast and received in wireless messages. The on-board computing unit 18 also determines an available communication channel and timeslot for broadcasting the non-safety related content based on monitoring communication activity on the communication network.

The host vehicle 10 may also include a human-machine interface (HMI) 20 for interfacing with a user of the vehicle. The above mentioned devices, modules, and subsystems are connected through a wired communication bus 22, such as a CAN, for communicating with one another. It is understood that the remote entity 12 as shown in FIG. 1 includes the same communication architecture of the host vehicle 10 as described above.

Data packets which contain the non-safety related content are broadcast to remote entities over a service communication channel (SCH). A control communication channel (CCH) is used by the host vehicle and other broadcasting entities in a given period of time to broadcast control-plane scheduling information that provide details to all other communication entities, these pieces of information include what the content of the broadcast data pertains to, the communication channel that the data packet will be broadcast on, and a timeslot at which the data packet will be broadcast on the selected communication channel. Any non-safety related content that an entity of the communication network may desire to obtain can tune to the selected channel at the respective time as set forth by the schedule in the CCH and receive the data packet provided by a service provider, if the entity is within the transmission range of the interested service provider.

The on-board computer 18 functions as its own channel access manager to dynamically negotiate a channel and timeslot for broadcasting a message containing its non-safety related content. The term negotiate as used herein describes an entity dynamically determining an available communication channel and timeslot for its own transmission based on observing communications over the ad hoc network broadcast spectrum. The on-board computer 18 monitors the communications channels and timeslot usage and negotiates a timeslot for broadcasting its own message. This allows channel access for respective broadcast times to be dynamically allocated to moving vehicles without creating inefficient scenarios of tying up a respective timeslot of a respective communication channel to remote vehicles that utilize respective timeslots infrequently. It should be understood that the participating vehicles in the communication network as described herein has dependence on the participating vehicles following a schedule. The schedule could be a respective vehicle's own non-public schedule or a schedule that has been publicly announced (e.g., over a CCH) over the communication network. The term schedule as used herein refers to a predictable pattern of channel usage by the respective participating vehicles of the communication network. The term non-public schedule refers to a pattern of channel usage that has not been publicly announced over a CCH or similar, but is readily determined by observing communication activity on the channel by the respective participating vehicle. The advantage of the participating vehicles of the communication network following a schedule is that the observance of their respective pattern of channel usage may be readily identified by each vehicle in the communication network and that each vehicle in the communication network desiring to broadcast messages may self-allocate its respective schedule on an available time slot.

Figure 3:
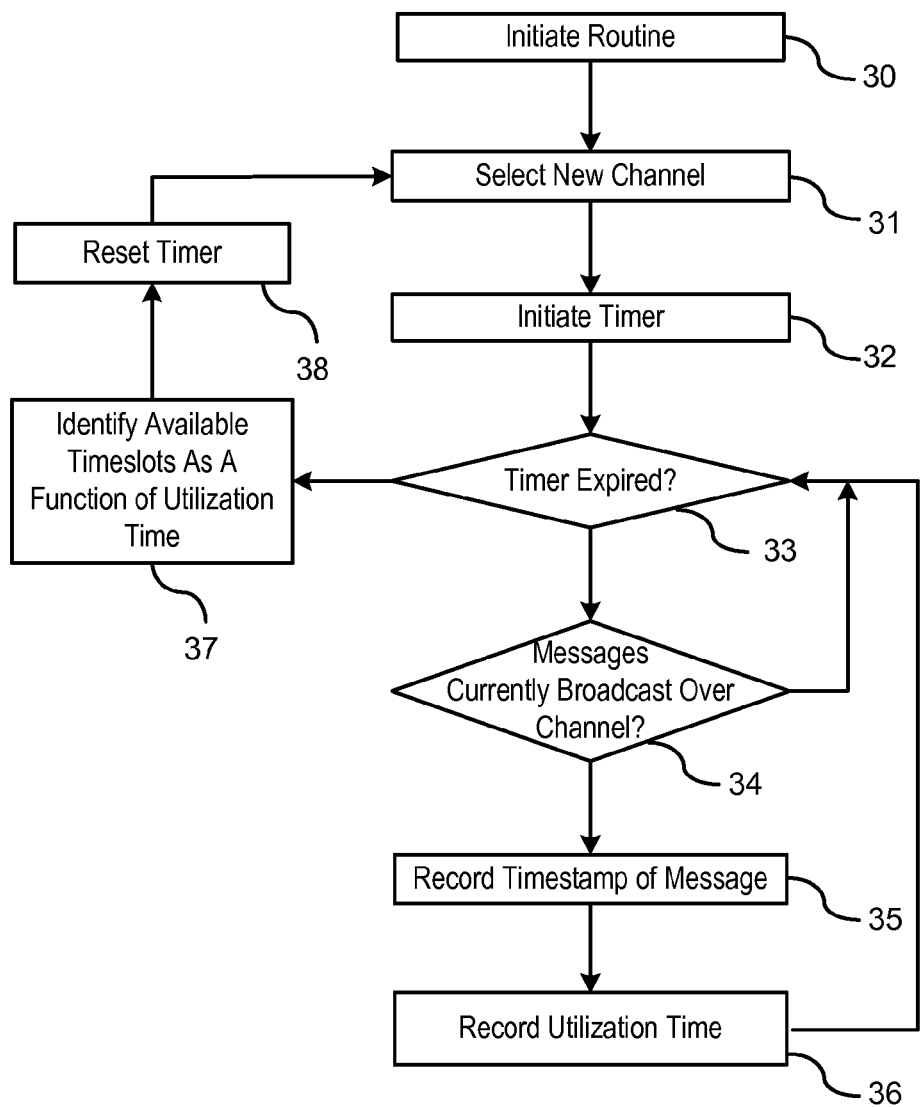
FIG. 3 is a flowchart for observing channel utilization over the inter-vehicle communication network.

FIG. 3 illustrates a flowchart for observing channel utilization over the inter-vehicle communication network. In block 30, the channel observation routine is initiated. In step 31, a new channel is selected from inter-vehicle ad hoc network broadcast spectrum to observe communications within the selected channel.

In step 32, a timer is initiated for providing a length of time to dwell on the respective channel for determining the utilization with the communication channel.

In step 33, a determination is made whether the timer is expired. If the determination is made that the timer is not expired, then a determination is made step 34 as to whether any messages are being broadcast over the channel.

If the determination is made in step 34 that no messages are being broadcast over the channel, the return is made to step 33 for determining whether the timer is expired. If the determination is made in step 34 that messages are being broadcast over the channel, then the routine procedure step 35.

In step 35, the timestamp of the message is recorded.

In step 36, the utilization time of the currently observed message is determined and recorded. A return is made to step 33 to determine if the timer is expired. If the timer is not expired, the routine will continuously check for messages on the currently monitored channel. The utilization time for each identified message on the currently monitored channel is determined and recorded.

In step 33, if the timer is expired, then a determination of available timeslots are determined based on the observed and recorded utilization time for each identified message on the current monitored channel in step 37. Each transmitting entity broadcasting messages over the communication network maintains a transaction list that includes an identification of each communication channel, the start time of an allocated timeslot, and a duration of the allocation timeslot within each channel. A list of open timeslots on the current monitored channel is determined along with characteristics of the channel that may be used in selecting a respective channel. Those characteristics include, but are not limited to, latency, packet delivery ratio (PDR), and throughput. Utilization time is a measure of the busy time $T_{busy}$ of the channel over the time period $T_{cycletime}$. Latency represents a response or delay caused by contention over the channel. For example, selection of a channel may be based on a channel with a low latency. PDR is a measure of the success of communicating a packet of data from one entity to another entity. Throughput is the average measure of the speed of broadcasting data packets in the currently monitored channel.

In step 38, the timer is reset. A return is then made to step 31 to select a new communication channel and observe communications over the new communication channel.

Figure 4:
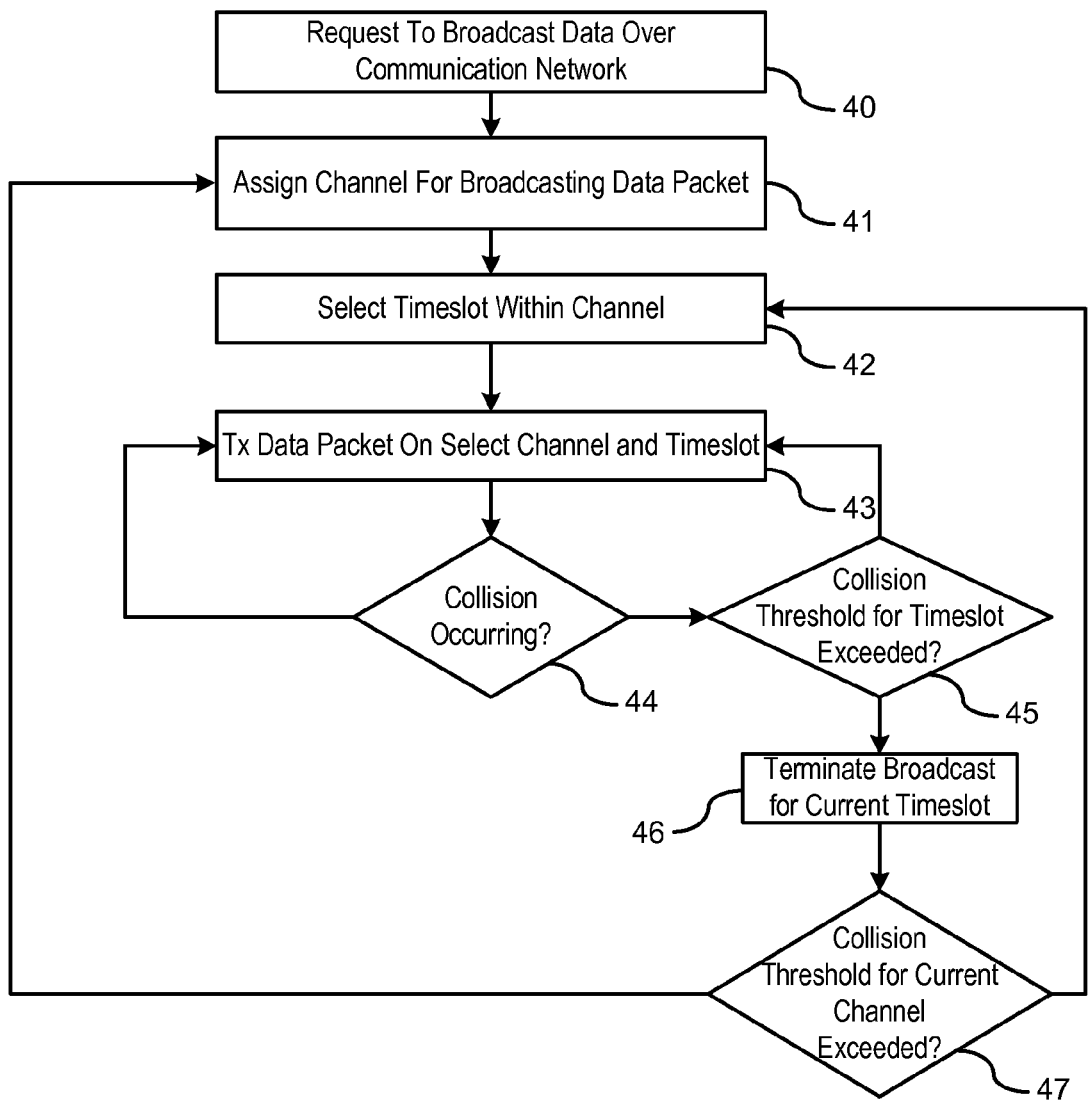
FIG. 4 is a flowchart of a method for detecting an available communication channel and timeslot.

FIG. 4 is a flowchart of a method for migrating to a communication channel and timeslot. In step 40, an application request is made to broadcast data over the inter-vehicle ad hoc communication network. Application request may include, but is not limited to, map data requests, multi-media requests, or any other non-safety related data requests.

In step 41, a channel is assigned for broadcasting the data packet based on the observations performed by the routine set forth in FIG. 3.

In step 42, a time slot within the channel is selected. The timeslot must be of a time duration that is equal to or exceeds the duration of time required to transmit the data packet.

In step 43, the data packet (or data packets if more than one) is broadcast on the selected channel at the selected timeslot.

In step 44, a determination is made whether a collision with another message occurs during the broadcast of the message. A collision refers to two or more messages being broadcast over the same channel at the same time resulting in interference as a result of the simultaneous data packet transmissions. The detection of collision could be achieved either by a standard MAC-layer acknowledgement mechanism or by an upper-layer middleware which is able to detect if the data packets are appropriately delivered.

In step 44, if the determination is made that no data packet collision occurred, then a return is made to step 43 to continue broadcasting the data packet(s). The routine continuously loops between step 43 and step 44 for checking whether a collision is occurring.

In step 44, if the determination is made that a collision is occurring, then the routine proceeds to step 45. In step 45, a determination is made whether the maximum number of allowed collisions has been violated. The timeslot threshold indicates the maximum allowable number of collisions before relinquishing the timeslot and searching for another timeslot. If the collision limit has not been exceeded, then a return is made to step 43 where broadcast of the data packet continues and the broadcast is monitored for further collisions.

In step 45, if the determination is made that the number of allowable collisions has been exceeded (either in absolute or consecutive terms), then the routine proceeds to step 46.

In step 46, broadcasting of the data packet for the current timeslot is terminated.

In step 47, a determination is made as to whether the number of message collisions on the current channel has been exceeded. A determination of whether the channel threshold is exceeded involves determining whether the number of collisions that have occurred on the channel has exceeded either a predefined total or consecutive limit. If a determination is made that the channel threshold is not exceeded, then a return is made to step 42 to find a next available timeslot within the current communication channel. If the determination in step 47 is that the channel threshold is exceeded, then a return is made to step 41 to select a next available communication channel.

While certain embodiments of the present invention have been described in detail, those familiar with the art to which this invention relates will recognize various alternative designs and embodiments for practicing the invention as defined by the following claims.

What is claimed is:

1. A method of dynamically self-allocating channel access for communication between communicating entities in an inter-vehicle ad hoc network, the method comprising the steps of:
    a respective entity observing communication activity over each inter-vehicle ad hoc network communication channel;
    the respective entity identifying available time slots within each communication channel for the respective entity to broadcast a data packet in response to the observed communication activity on a respective channel;
    selecting an available communication channel and timeslot to broadcast the data packet by the respective entity based on the observed communication activity on the respective channel;
    the respective entity broadcasting a message within the inter-vehicle ad hoc network that provides a schedule identifying the communication channel and time slot selected for broadcasting the data packet by the respective entity; and
    broadcasting the data packet over the selected communication channel at the respective timeslot and maintaining by each transmitting entity a transaction list that includes an identification of each communication channel, the start time of an allocated timeslot, and a duration of the allocated timeslot within each channel.

2. The method of claim 1 wherein selecting an available communication channel and timeslot to broadcast the data packet further comprises:
    determining a duration of time required to broadcast the data packet;
    determining a duration of time of a potential timeslot;
    selecting the timeslot as an available timeslot selection for broadcasting the data packet if the duration of time of the respective available timeslot is at least equal to the duration of time required to transmit the data packet.

3. The method of claim 1 further comprising the steps of:
    determining if a data packet collision occurred with another data packet transmission;
    selecting a next available timeslot within the selected communication channel; and
    broadcasting the data packet at the next identified available timeslot within the selected communication channel.

4. The method of claim 1 further comprising the steps of:
    determining if a data packet collision occurred with another data packet transmission;
    repeatedly broadcasting the data packet at the available timeslot on the selected communication channel for a predetermined period of time;
    selecting a next available timeslot within the selected communication channel in response to a data packet collision occurring during each transmission of the data packet; and
    broadcasting the data packet at the next identified available timeslot within the selected communication channel.

5. The method of claim 4 further comprising the steps of:
    selecting a next available communication channel in response to no available timeslots for data packet transmission in a current identified communication channel.

6. The method of claim 1 wherein identifying a communication channel for selection is based on a utilization factor, a latency factor, a packet delivery ratio factor, and a throughput factor.

7. The method of claim 1 wherein observing communication activity over each inter-vehicle ad hoc network communication channel by a respective entity includes recording timestamps of all incoming and outgoing messages on each channel.

8. The method of claim 7 wherein available timeslots are determined as a function of measuring a busy time of the channel over a respective time period of the channel.

9. A channel access for communication system within an inter-vehicle ad hoc network for allocating access communication timeslots within one of a plurality of communication channels within the inter-vehicle ad hoc network, the system comprising:
    a controller of a transmitting entity for selectively controlling a broadcast of data packets over the inter-vehicle ad hoc network by the transmitting entity, the controller observing communication activity over each of the communication channels by a respective entity, the controller determining available time slots within each communication channel for the respective entity to transmit a data packet in response to the observed communication activity, the controller identifying an available communication channel and timeslot to transmit the data packet based on the observed communication activity on the respective channel; and
    a transmitter of the transmitting entity for broadcasting a message within the inter-vehicle ad hoc network that provides a schedule identifying the communication channel and time slot selected for broadcasting the data packet by the respective entity, the transmitter further broadcasting the data packet over the selected communication channel at the respective timeslot, wherein the controller maintains a transaction list that includes an identification of each communication channel, the start time of an allocated timeslot, and a duration of the allocated timeslot within each channel.

10. The system of claim 9 wherein the controller determines if a data packet collision occurred with another data packet transmission, and wherein the controller identifies a next available timeslot within the selected navigation channel, and wherein the transmitter broadcasts the data packet at the next identified available timeslot within the selected communication channel.

11. The system of claim 9 wherein the controller determines if a data packet collision occurred with another data packet transmission, and wherein the transmitter repeatedly transmits the data packet at the available timeslot on the selected communication channel for a predetermined period of time, wherein the controller identifies a next available timeslot within the selected communication channel in response to a data packet collision occurring during each broadcast of the data packet, and wherein the transmitter broadcast the data packet at the next identified available timeslot within the selected communication channel.

12. The system of claim 9 wherein the controller identifies a communication channel for selection that is based on a utilization factor, a latency factor, packet delivery ratio factor, and a throughput factor.

13. The system of claim 9 wherein the controller records a timestamp of all incoming and outgoing messages on each communication channel.

14. The system of claim 9 wherein the controller determines available timeslots is a function of measuring a busy time of the communication channel over a respective time period of the communication channel.

15. The system of claim 9 wherein the transmitting entity includes a vehicle.

16. The system of claim 9 wherein the transmitting entity includes a roadside equipment unit.

17. The system of claim 9 wherein the transmitting entity includes a pedestrian.

* * * * *